US007830652B2

(12) United States Patent
Su et al.

(10) Patent No.: US 7,830,652 B2

(45) Date of Patent: Nov. 9, 2010

(54) MONITOR AND MONITOR CORRECTION APPARATUS THEREOF

(75) Inventors: Tsung-Hsien Su, Tainan County (TW); Tsung-Ho Chen, Tainan County (TW); Kou-Lin Chou, Tainan County (TW); Wei-Peng Wang, Tainan County (TW)

(73) Assignee: Chi Lin Technology Co., Ltd, Tainan County (TW)

( * ) Notice: Subject to any disclaimer, the term of this patent is extended or adjusted under 35 U.S.C. 154(b) by 96 days.

(21) Appl. No.: 12/408,766

(22) Filed: Mar. 23, 2009

(65) Prior Publication Data

US 2010/0134960 A1 Jun. 3, 2010

(30) Foreign Application Priority Data

Dec. 2, 2008 (TW) .............................. 97146710 A

(51) Int. Cl.
*G06F 1/16* (2006.01)

(52) U.S. Cl. ................... 361/679.27; 362/97.1; 349/68; 345/206; 40/610

(58) Field of Classification Search ................... 40/558, 40/610; 349/68, 58, 65; 362/97.1, 97.2, 362/613, 341, 624; 361/679.01, 679.26, 361/679.21, 679.27, 679.06, 679.02, 679.04, 361/679.55, 679.58, 679.4, 679.22, 679.3, 361/679.09; 700/167; 345/173, 55, 100, 345/175, 63, 206; 312/223.2

See application file for complete search history.

(56) References Cited

U.S. PATENT DOCUMENTS 4,887,219 A * 12/1989 Strauser ...................... 700/167
5,379,540 A * 1/1995 Howard ....................... 40/558
5,850,205 A 12/1998 Blouin
6,950,098 B2 9/2005 Brabander et al.
7,038,186 B2 5/2006 De Brabander et al.
7,166,829 B2 1/2007 De Brabander et al.
7,288,896 B2 10/2007 Edelbrock
2005/0190136 A1 9/2005 Edelbrock
2006/0274022 A1 12/2006 Ohashi et al.
2007/0091127 A1 4/2007 Edelbrock
2010/0172126 A1* 7/2010 Hayashi ..................... 362/97.1

FOREIGN PATENT DOCUMENTS

EP 1619540 A1 1/2006
JP 8292129 A 11/1996

* cited by examiner

*Primary Examiner*—Hung V Duong
(74) *Attorney, Agent, or Firm*—Ming Chow; Sinorica, LLC

(57) ABSTRACT

A monitor correction apparatus and a monitor having the same are provided. The monitor having the monitor correction apparatus includes a display panel and a first frame. The first frame covers a perimeter of the display panel and defines a display area. The monitor correction apparatus includes a front bezel that is integrally formed with the first frame and covers a part of the display area. Moreover, the monitor correction apparatus includes guide pins that are formed inside the first frame and near the front bezel. The monitor correction apparatus also includes a flexible printed circuit board which has at least one guide hole to be inserted by the guide pins. One end of the flexible printed circuit board extends into the front bezel. An optical sensor is disposed on the flexible printed circuit board and inside the front bezel and has an optical signal receiving zone.

20 Claims, 4 Drawing Sheets

MONITOR AND MONITOR CORRECTION APPARATUS THEREOF

BACKGROUND OF THE INVENTION

1. Technical Field

The present invention relates to a monitor correction apparatus and a monitor. More particularly, the present invention relates to a correction apparatus for correcting chromatic aberration, brightness, and so on of a monitor.

2. Description of Related Art

Nowadays, commercially available monitors, such as liquid crystal displays, typically allow arbitrary adjustment of monitor contrast and brightness by users. However, the allowable range of contrast adjustment has been restricted to the minimum before the monitors are shipped from factories. Therefore, the default settings of the monitors impose limitation upon users' attempt to adjust monitor contrast to increase monitor resolution.

Such limitation has certain impact on those who depend on monitors as a means for measurement and interpretation. For example, medical workers have to keep their monitors turned on for a long time and rely on the contrast and resolution of the monitors to determine contents displayed thereon. If monitor resolution cannot be enhanced, visual error will occur and cause huge trouble to the medical workers.

Therefore, in view of the above, it is a pressing issue for related industries to remedy the drawbacks of conventional correction apparatuses and increase the functionality and practicality of such apparatuses, thereby enabling rapid and real-time enhancement of image resolution and preventing erroneous result interpretation which might otherwise occur due to visual errors caused by chromatic aberration and uneven brightness.

BRIEF SUMMARY OF THE INVENTION

In order to overcome the aforesaid shortcomings of the prior art, the present invention provides a monitor correction apparatus used with a monitor which comprises a display panel and a first frame, and the first frame covers the perimeter of the display panel to define a display area. The monitor correction apparatus comprises a front bezel integrally formed with the first frame, a flexible printed circuit board, and an optical sensor disposed on the flexible printed circuit board, and the front bezel covers a part of the display area. In addition, at least one guide pin is disposed inside the first frame and near the front bezel for inserting into the corresponding guide hole on the flexible printed circuit board. One end of the flexible printed circuit board extends into the front bezel. The optical sensor is disposed on the flexible printed circuit board and has an optical signal receiving zone.

Hence, a primary object of the present invention is to provide a monitor correction apparatus capable of real-time correction of displayed images so as to significantly increase image quality and image processing efficiency of a monitor.

A secondary object of the present invention is to provide a monitor correction apparatus comprising a flexible printed circuit board so as to minimized the monitor correction apparatus and facilitate assembly of the monitor correction apparatus and the monitor.

In addition, the present invention also provides a monitor comprising a display panel, a first frame, and a monitor correction apparatus. The first frame covers the perimeter of the display panel to define a display area. The monitor correction apparatus comprises a front bezel integrally formed with the first frame, a flexible printed circuit board, and an optical sensor disposed on the flexible printed circuit board, and the front bezel covers a part of the display area. Additionally, at least one guide pin is disposed inside the first frame and near the front bezel for inserting into corresponding guide hole on the flexible printed circuit board. One end of the flexible printed circuit board extends into the front bezel. The optical sensor is disposed on the flexible printed circuit board and has an optical signal receiving zone.

Therefore, another object of the present invention is to provide a monitor having a monitor correction apparatus capable of real-time correction of displayed images so as to significantly increase image quality and image processing efficiency of the monitor.

Yet another object of the present invention is to provide a monitor which uses a monitor correction apparatus comprising a flexible printed circuit board so as to minimized the monitor correction apparatus and facilitate assembly of the monitor correction apparatus and the monitor.

BRIEF DESCRIPTION OF THE SEVERAL VIEWS OF THE DRAWINGS

The invention as well as a preferred mode of use, further objectives and advantages thereof will be best understood by referring to the following detailed description of illustrative embodiments in conjunction with the accompanying drawings, wherein.

DETAILED DESCRIPTION OF THE INVENTION

Disclosed herein are a monitor correction apparatus and a monitor. The principles of image signal processing and of assembly of basic elements involved are readily comprehensible by persons skilled in the art and therefore are not described in detail herein. Besides, the drawings referred to in the following description are not drawn according to actual dimensions and need not be so because they are intended to demonstrate only schematically structures characteristic of the present invention.

Figure 1:
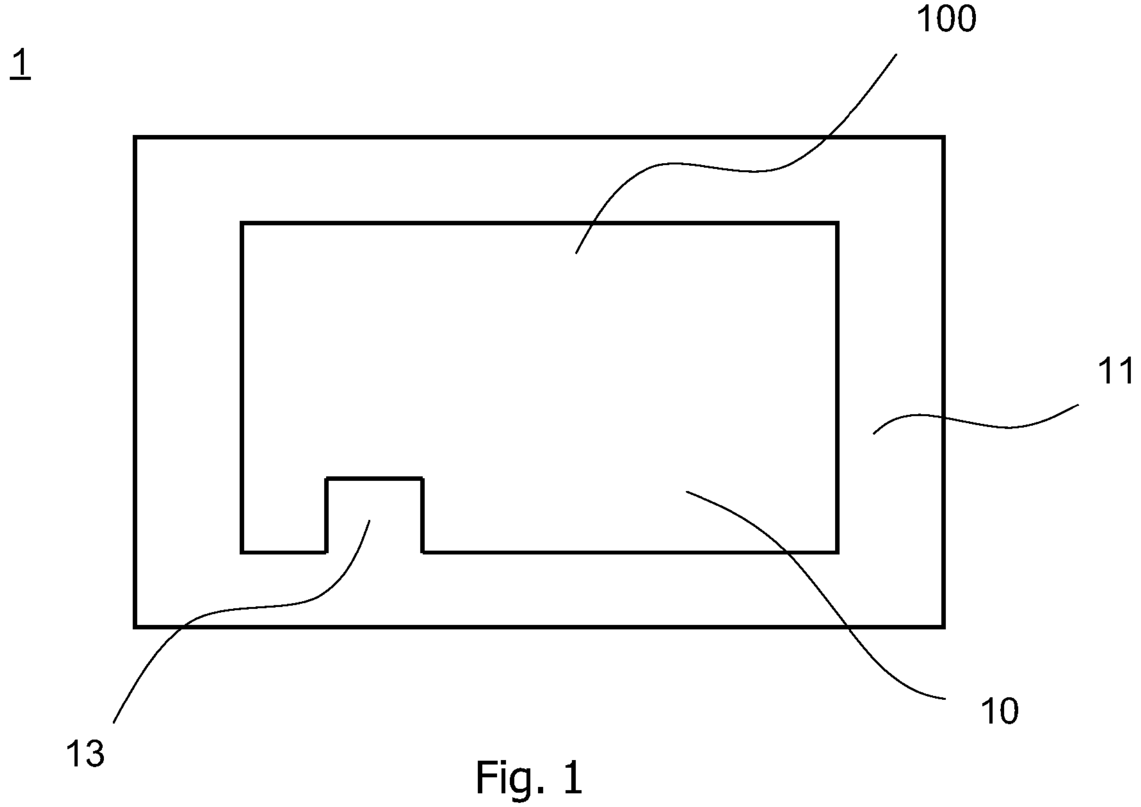
FIG. 1 is a schematic drawing of a monitor correction apparatus and a monitor according to a first embodiment of the present invention.

Please refer to FIG. 1 for a schematic drawing of a monitor correction apparatus according to a first preferred embodiment of the present invention. A monitor 1 equipped with a monitor correction apparatus 13 comprises a display panel 10 and a first frame 11. The first frame 11 covers the perimeter of the display panel 10 and defines a display area 100.

Figure 2:
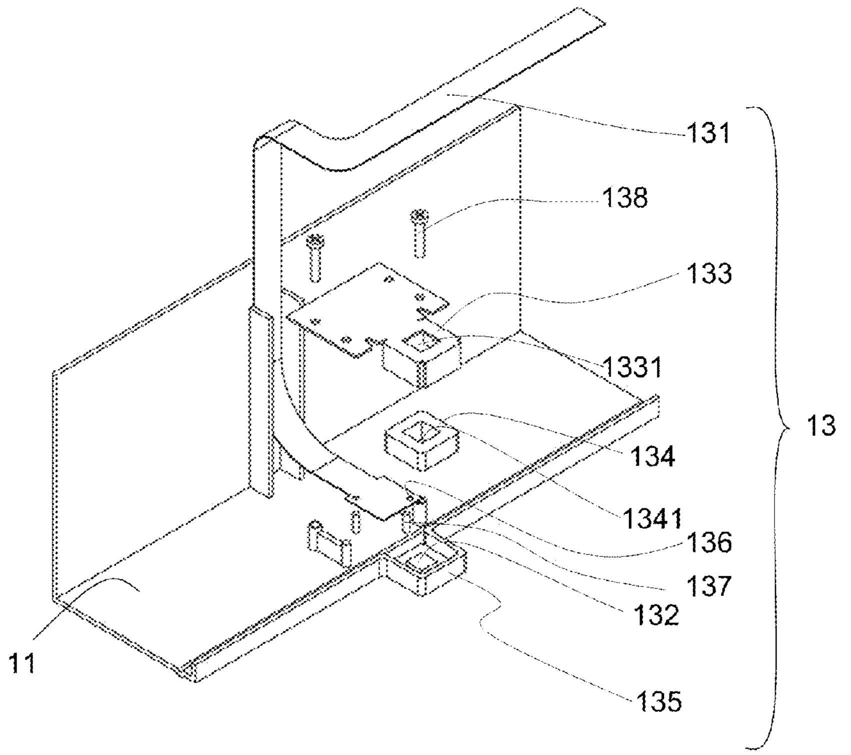
FIG. 2 is an exploded view of the monitor correction apparatus according to the first embodiment of the present invention.

Referring to FIG. 2 for an exploded view of the monitor correction apparatus 13 according to the first preferred embodiment of the present invention, the monitor correction apparatus 13 comprises a front bezel 135 integrally formed with the first frame 11 and covering a part of the display area 100 (FIG. 1). Guide pins 136 are disposed inside the first frame 11 and near the front bezel 135. The monitor correction apparatus 13 further comprises a flexible printed circuit board 131 formed with guide holes 137. Each of the guide pins 136 inserts into the corresponding guide hole 137 to fix the flexible printed circuit board 131 in position on the first frame 11. Preferably, there are two said guide holes 137 and two said guide pins 136. One end of the flexible printed circuit board 131 extends into the front bezel 135. An optical sensor 132 is disposed on the flexible printed circuit board 131 and inside the front bezel 135. The optical sensor 132 has a specific optical signal receiving zone.

Moreover, according to a preferred configuration of the present invention, a support pad 134 having an opening 1341 is additionally provided on the flexible printed circuit board 131 and around the optical sensor 132. The support pad 134 is capable of supporting the flexible printed circuit board 131. The opening 1341 of the support pad 134 has an area which is preferably larger than the area of the optical signal receiving zone of the optical sensor 132, so as not to obstruct or affect optical signals received by the optical sensor 132. In order to fix the support pad 134 and the flexible printed circuit board 131 in position to the front bezel 135, a second frame 133 is further provided. The second frame 133 is preferably secured in position inside the first frame 11 by a screw fastening assembly 138. The second frame 133 further comprises a window 1331 located above and corresponding in position to the optical sensor 132. The window 1331 also has an area which is larger than the area of the optical signal receiving zone of the optical sensor 132, so that the optical sensor 132 can receive optical signals without being affected by the window 1331.

Figure 3:
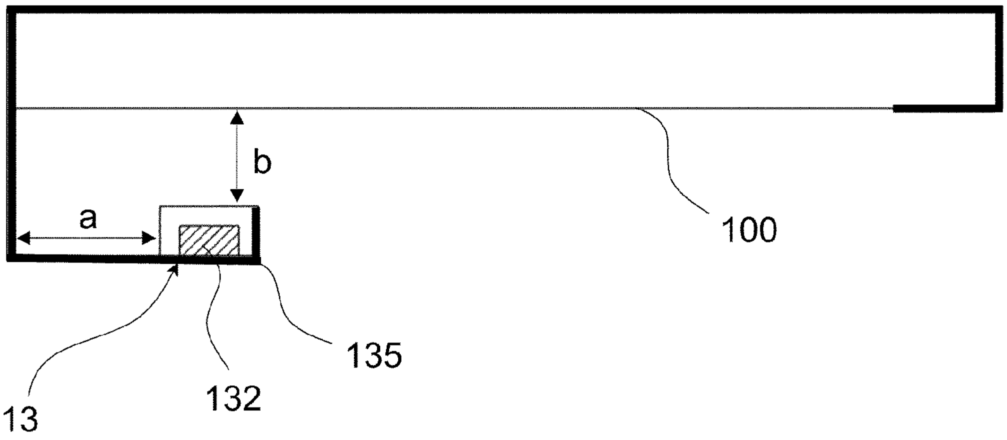
FIG. 3 is a schematic drawing showing a relative position between the monitor correction apparatus and a display area according to the first embodiment of the present invention.

FIG. 3 is a schematic drawing showing a relative position between the monitor correction apparatus 13 and the display area 100 according to the first preferred embodiment of the present invention. The part of the display area 100 that is covered by the front bezel 135 of the monitor correction apparatus 13 has an area preferably equal to or less than about 1% of the display area 100 or, more preferably, equal to about 0.05% of the display area 100. The distance a between the optical sensor 132 and the edge of the display area 100 is preferably at least 0.7 mm or, more preferably, is 1 mm. In addition, the optical sensor 132 is vertically spaced from the display area 100 by a distance b, which is preferably not greater than 5 mm or, more preferably, is 3.4 mm.

Figure 4:
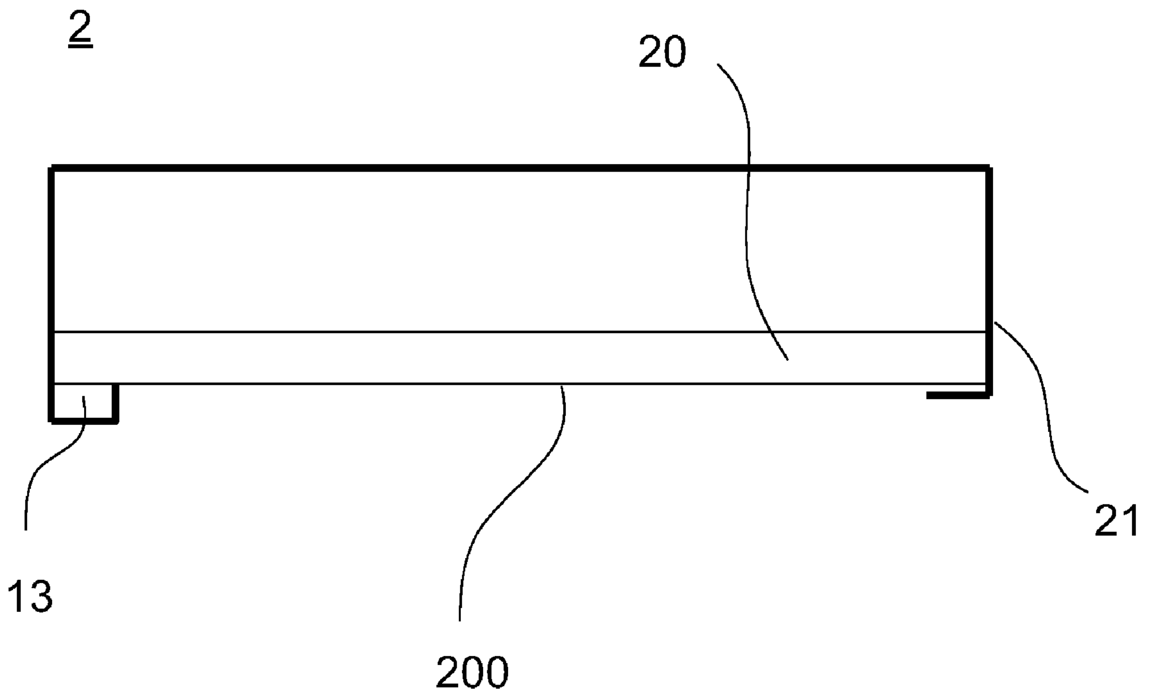
FIG. 4 is a schematic drawing of a monitor having a monitor correction apparatus according to a second embodiment of the present invention.

Referring to FIG. 4, the present invention further provides a monitor 2 having a monitor correction apparatus 13 as a second preferred embodiment. The monitor 2 comprises a display panel 20, a first frame 21, and the monitor correction apparatus 13. The first frame 21 covers the perimeter of the display panel 20 to define a display area 200. The monitor correction apparatus 13 covers a part of the display area 200. The monitor correction apparatus 13 in the present embodiment has substantially the same features as its counterpart in the first preferred embodiment and is not described repeatedly herein.

The present invention is demonstrated herein by reference to the preferred embodiments, and it is understood that the embodiments are not intended to limit the scope of patent protection for the present invention, if granted. Moreover, as the contents disclosed herein should be readily understood and can be implemented by a person of ordinary skill in the art, all equivalent changes or modifications which do not depart from the spirit of the present invention should be encompassed by the appended claims.

The invention claimed is:

1. A monitor correction apparatus for use with a monitor which comprises a display panel and a first frame, the first frame covering a perimeter of the display panel to define a display area, the monitor correction apparatus being characterized by comprising:

a front bezel integrally formed with the first frame and covering a part of the display area;

at least a guide pin disposed inside the first frame and near the front bezel;

a flexible printed circuit board having at least a guide hole for being inserted by the guide pin, the flexible printed circuit board having an end extending into the front bezel; and an optical sensor disposed on the flexible printed circuit board and inside the front bezel and having an optical signal receiving zone.

2. The monitor correction apparatus of claim 1, further comprising a support pad having an opening and disposed on the flexible printed circuit board and around the optical sensor.

3. The monitor correction apparatus of claim 2, wherein said opening has an area which is larger than that of said optical signal receiving zone.

4. The monitor correction apparatus of claim 3, further comprising a second frame disposed inside the first frame and securing both the support pad and the flexible printed circuit board to the front bezel, wherein the second frame comprises a window which is located in position above and corresponding to the optical sensor.

5. The monitor correction apparatus of claim 4, wherein said window has an area which is larger than that of said optical signal receiving zone.

6. The monitor correction apparatus of claim 4, further comprising a screw fastening assembly for securing the second frame inside the first frame.

7. The monitor correction apparatus of claim 1, wherein there are two said guide pins and two said guide holes.

8. The monitor correction apparatus of claim 1, wherein said part of the display area covered by the front bezel has an area which is not greater than 1% of the display area.

9. The monitor correction apparatus of claim 1, wherein the distance between the optical sensor and an edge of the display area is no less than 0.7 mm.

10. The monitor correction apparatus of claim 1, wherein the optical sensor is vertically spaced from the display area by no more than 5 mm.

11. A monitor having a monitor correction apparatus, comprising a display panel, a first frame, and the monitor correction apparatus, wherein the first frame covers a perimeter of the display panel and defines a display area, the monitor being characterized in that the monitor correction apparatus comprises:

a front bezel integrally formed with the first frame and covering a part of the display area;

at least a guide pin disposed inside the first frame and near the front bezel;

a flexible printed circuit board having at least a guide hole for being inserted by the guide pin, the flexible printed circuit board having an end extending into the front bezel; and an optical sensor disposed on the flexible printed circuit board and inside the front bezel and having an optical signal receiving zone.

12. The monitor of claim 11, further comprising a support pad having an opening and disposed on the flexible printed circuit board and around the optical sensor.

13. The monitor of claim 12, wherein said opening has an area which is larger than that of the optical signal receiving zone.

14. The monitor of claim 13, further comprising a second frame disposed inside the first frame and securing both the support pad and the flexible printed circuit board to the front bezel, wherein the second frame comprises a window which is located in position above and corresponding to the optical sensor.

15. The monitor of claim 14, wherein said window has an area which is larger than that of the optical signal receiving zone.

16. The monitor of claim 14, further comprising a screw fastening assembly for securing the second frame inside the first frame.

17. The monitor of claim 11, wherein there are two said guide pins and two said guide holes.

18. The monitor of claim 11, wherein the part of the display area covered by the front bezel has an area which is not greater than 1% of the display area.

19. The monitor of claim 11, wherein the distance between the optical sensor and an edge of the display area is no less than 0.7 mm.

20. The monitor of claim 11, wherein the optical sensor is vertically spaced from the display area by at no more than 5 mm.

* * * * *